Figure 1:
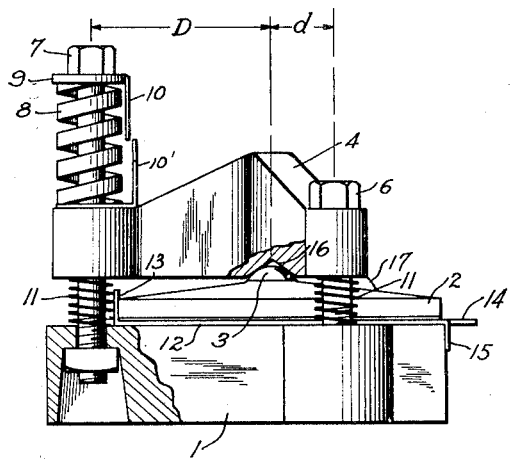

Nov. 8, 1949  P. Z. ANDERSON  2,487,631
LAMINATING PRESS
Filed Nov. 18, 1946

Paul Z. Anderson
INVENTOR.

BY
Milton W. Lu
AGENT

Patented Nov. 8, 1949

2,487,631

UNITED STATES PATENT OFFICE 2,487,631

LAMINATING PRESS

Paul Z. Anderson, Los Angeles, Calif.

Application November 18, 1946, Serial No. 710,497

11 Claims. (Cl. 154—1)

This invention relates to a press, and particularly to a portable press adapted particularly for the preparation of laminated plastic protectors for small cards, pictures, and the like.

Plastic laminating as a means for protecting small flat articles such as identification cards, photographs and the like, has recently developed into a rather important process. For example, by this means it is possible to protect articles such as identification cards from wear, moisture, or other deteriorating influences, by coating the cards with a thin layer of transparent plastic, of somewhat larger area than the cards themselves, the plastic not only forming a seal around the outside edges of the card, but also in most instances bonding directly to the card itself, so that it becomes impossible to remove the protective covering and alter the card itself. This latter feature is of particular value in preventing forgery of passports, etc.

Although it would obviously be highly desirable to have some means in the home for protecting by such plastic laminations articles such as photographs, recipes, photographic film, cards, locks of hair, rare old lace samples, etc., this has not hitherto been practicable. Though plastic sheets of the desired nature are available, the process of laminating these around the article to be protected involves the application of high pressures and high temperatures. Thus for example pressures in the range of about 150 to 500 pounds per sq. in. are required, as well as temperatures in the range of about 200° to 500° F., and these must be applied concurrently. The total pressure will of course depend on the size of the article to be protected. Thus for example for an article having a size of 4" x 5", or an area of 20 sq. ins., the application of a pressure of 250 pounds per sq. in. necessitates the application of a total pressure or load of 5,000 pounds and this load must be maintained while the work is subjected to the above high temperatures.

It is an object of this invention to supply a press which will provide for ready attainment of pressures of the above magnitude in a home workshop.

It is a further object of this invention to supply a press which will be sufficiently strong to develop total pressures as great as about 10,000 pounds, and yet which is sufficiently small to be portable and to fit inside the cooking oven of an ordinary household range. Thus the work, such as the plastic laminations and the article to be protected, may be placed in the press and subjected to the necessary pressure, and the entire press and the work therein may be placed inside the oven for the application of the necessary heat. This provides an extremely convenient means of accomplishing protection of small articles by plastic lamination in the home.

It is a further object of this invention to supply a press in which the pressure is readily applied merely by tightening one bolt, and in which a reduction in the thickness of the work being compressed (such as that which occurs in plastic laminating due to flow of the plastic during the heating period) is compensated for, without appreciable loss in pressure on the work. Further objects and advantages of the invention will become apparent in the following description of the apparatus as shown in the attached drawing.

Figure 2:
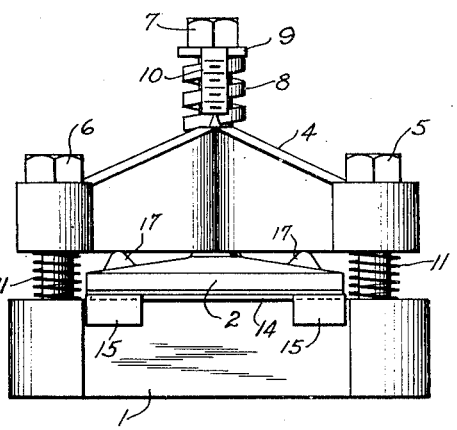
Figure 3:
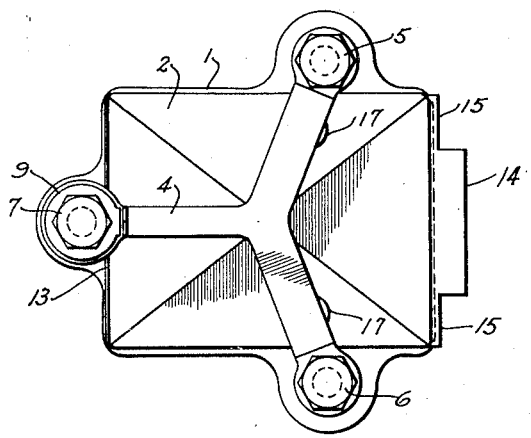

Figure 1 is a side view, Figure 2 a front view and Figure 3 is a top view, of the press.

Referring to the drawing, base 1 and pressure pad 2 form the lower and upper platens, i. e., the fixed and movable platens, respectively, of the press. The pressure is applied to central point 3 of pad 2 by means of loading lever 4. This lever 4 is in the form of a three-armed spider, the arms being joined at the fulcrum, which is directly above and bears on central point 3 of pad 2. The three arms terminate at points just outside of rectangular pressure pad 2. Through these terminals pass bolts 5, 6 and 7, which thread into base 1 or into nuts imbedded therein as indicated in Fig. 1. Two of the arms of lever 4, i. e., the "reaction" arms which terminate at reaction bolts 5 and 6, extend symmetrically toward the sides of pad 2 and terminate an equal distance $d$ forward from the fulcrum, while the third or "loading" arm, terminating in loading bolt 7, extends straight backward from the fulcrum a distance $D$. Thus loading lever 4 may be considered as a split lever having a mechanical advantage $D/d$, the short arm, terminating in bolts 5 and 6, being the split arm. The heads of bolts 5 and 6 may bear directly on the reaction arms, but between the head of loading bolt 7 and lever 4 is a heavy loading spring 8, which may be separated from the head of bolt 7 by bearing washer 9.

The above parts operate as follows: The work to be pressed is placed in the bed, i. e., between the flat faces or platens of base 1 and pad 2. The loading lever 4 is then pushed down on the pad 2, tightening reaction bolts 5 and 6 finger tight before tightening loading bolt 7. The amount of load exerted by bolt 7 may be measured with reasonable accuracy by measuring the degree of compression of spring 8. Due to the mechanical advantage of lever 4, the total load exerted by reaction bolts 5 and 6 will be D/d times that exerted by bolt 7. Thus if distance D is twice as great as distance d, and a 1000 lb. load is applied to bolt 7, bolts 5 and 6 will contribute 1000 x 2 or 2000 pounds, or 1000 lbs. each, and the total load applied will be 3000 lbs. If this is applied to 10 square inches of work between platens 1 and 2, the pressure on the work will be 300 lbs. per sq. inch.

The advantages of the above construction will be apparent on a closer consideration of the press. The use of a centrally loaded pad, i. e., the fact that the pressure is applied only at one point, which is the central point of the pad, provides a uniform distribution of pressure over the entire pad, and also provides a uniform load on all the bolts, except for the leverage factor as indicated above. The use of three bolts, in the form of a split lever as described, permits the application of a relatively large load by means of a relatively small load at only one point. Thus the total pressure is applied merely by screwing down one bolt, the other two bolts being automatically loaded thereby. The construction shown also permits considerable increase in the thickness of the work to be compressed merely by unscrewing the bolts to the desired extent, and conversely a decrease by the opposite operation. Another extremely important feature is the use of the loading spring 8. By the use of this spring any large reduction in pressure caused by a reduction in thickness of the work during the pressure period is avoided. This is especially important in the preparation of laminated plastic protectors. Thus when the plastic is compressed in the press, and the press is placed in the oven to seal the plastic, the plastic will flow to some extent and thus be reduced in thickness. In the absence of loading spring 8 this reduction in thickness, even though relatively small, would obviously cause an extremely large reduction in pressure. When loading spring 8 is employed however, a slight decrease in thickness of the work is taken up by the spring without appreciable reduction in pressure.

Although the above are the most essential features of the press, additional features which provide for exceptional utility and convenience are as follows:

Scale 10 together with pointer 10' serves to show the operator at any time the amount of pressure or load being applied, since this will be a function of the amount of compression of spring 8. It may be calibrated in pounds per square inch pressure, or total load in pounds, or any other scale desirable. Lifting springs 11 are supplied for each bolt, and serve to keep lever 4 in an elevated position when the press is not in operation. This facilitates the charging of the press considerably, since it means that it is unnecessary to lift lever 4 manually during the charging and discharging operation. Another aid to the charging and discharging operation is charging plate 12, which is inserted between the two platens. One end 13 of charging plate 12 is turned up. At the other end of plate 12, part of the plate is allowed to extend beyond the platens to form handle 14 and at each side a portion of the plate is turned downward to form tabs 15. Thus in charging the press, the work may be properly spread on plate 12, pad 2 placed thereon, and the assembly or "charge" slipped into the press. The bolts 5 and 6 or the lifting springs 11 around them serve as guides to keep the charge in lateral alignment, and the tabs 15 serve to adjust the charge to the exact position desired. This facilitates centering of the charge, and prevents slippage of the laminations in the charge during the charging operation.

If desired central point 3 of pad 2 may be raised and hemispherical in shape, and a recess 16 may be made in lever 4 to accommodate the raised central point. This also serves to provide a larger bearing surface than a simple point contact, without losing the advantages of a point contact. Leveling knobs 17 may be provided between pad 2 and the reaction arms of lever 4, being fastened to either the pad or the arms. These leveling knobs 17 serve to maintain lever 4 in a laterally level position with respect to pad 2 as the lever is being pushed down over the work. Preferably they are small enough to keep the loading arm at a somewhat higher level than the reaction arms at this stage, so that when the full load is subsequently applied to the loading arm it will be approximately level with the reaction arms, and leveling knobs 17 will not be in contact with the lever or pad as the case may be.

As a specific example of the use of the press, a 3¼" x 4¼" photograph was coated with a plastic protector as follows:

On each side of the photograph a thin sheet of a nitro-cellulose plasticizer was placed; outside each sheet of plasticizer a sheet of cellulose acetate plastic laminating stock was placed; outside each of these plastic sheets a chromium plated ferrotype plate of the type used in photography was placed; and outside each ferrotype plate a blotter was placed. Thus the work consisted of nine sheets, the photograph being the innermost sheet and the other sheets as described above overlapping slightly around the edges of the photograph. This work was placed on charging plate 12 of a press constructed substantially as illustrated in the drawing, and having a bed of size 4" x 5", i. e., a total area of 20 sq. in. On top of the work pressure pad 2 was placed, and the charging plate, work, and pressure pad were together inserted in position between the base of the press and the loading lever. Bolts 5 and 6 were tightened finger tight with the fulcrum of lever 4 in contact with the central point 3 of pad 2, and with loading spring 8 substantially fully extended. Then loading bolt 7 was tightened until the contraction of loading spring 8 as indicated on scale 10 corresponded to a total load of 5,000 pounds. The entire press containing the compressed work was then placed in the oven of an ordinary gas range having a heat control thermostat, the oven having previously been heated to 400° F. at which point the thermostat was set. The press was left in the oven for twenty-five minutes, at which time it was estimated the temperature of the photograph and surrounding sheets of the work had risen to approximately 300° F. At this point the press was taken from the oven, cooled in the sink with running water, and the loading bolt was loosened, the reaction bolts loosened, and the work taken from the press. It was found that the plastic had made a perfect seal around the photograph, and when the uneven edges of the plastic were properly trimmed with a scissors, a perfectly protected and attractive appearing photograph remained.

In the specific press employed above, cast aluminum was used as the material of construction of the base, pressure pad, and lever. The base was recessed as indicated to accommodate the bolts and nuts; and the entire press weighed only about six pounds. The ratio of distance D to distance d was approximately 4 to 1. Thus the load on the loading lever was only 1,000 lbs. while the load on each of the reaction bolts was 2,000 pounds. It may be noted that although the mechanical advantage of the lever itself was $D/d$, or 4 to 1, the mechanical advantage of the press was $(D+d)/d$, or 5 to 1, since a 1000 lb. load on the loading lever resulted in a 5000 lb. load on the work. Obviously other ratios may be employed to obtain greater or smaller degrees of leverage.

Many modifications may be made in the above equipment without departing from the scope of the invention. The press may be so arranged that lifting springs 11 will support the pad 2 as well as lever 4 while the press is being charged. This would make it unnecessary to remove the pad during the charging operation. This modification may be accomplished by any suitable means, as for example merely by fastening brackets to the pressure pad as shown, at points adjacent to the bolts, and bending the brackets outward at the tops of springs 11 so as to fit between the springs and the terminals of lever 4, at a sufficient distance below these terminals to allow for some independent rocking of the lever on its fulcrum. It may also be accomplished by attaching or casting directly on pressure pad 2, split lugs which will fit around the bolts and engage the tops of the springs 11. Either modification may necessitate recessing the lower ends of the springs 11 into base 1 sufficiently to accommodate the springs when pad 2 is in the completely depressed position. If desired additional light springs may be placed above such brackets or split lugs, between them and the lever arms.

The above construction has the advantage that pad 2 and lever 4 are always in the proper contact at point 3, and no adjustment is ever necessary. The same advantage may be accomplished by actually joining pad 2 and lever 4 by means of suitable springs or simply by the use of a universal joint at the fulcrum.

It may be noted that bolts 5 and 6 serve as a convenient means for holding the reaction arms of lever 4 at a predetermined fixed point or distance from the fixed platen while the loading arm is being lowered and the load applied. Any other suitable means may be used for this purpose, such as posts fastened to base 1 and extending upwardly, the posts being fitted with notches into which the terminals of the reaction arms may be fitted.

Other modifications may also be employed to advantage. For example lever 4 may be attached by hinges to some means such as bolts or notched posts as indicated above for maintaining the terminals of the reaction arms at a predetermined fixed distance above the fixed platen; the terminals of the reaction arms may fit around bolts 5 and 6 by means of split lugs rather than rings as shown; the heads of bolts 5 and 6 may be hemispherical in shape where they contact the terminals of the reaction arms of lever 4, and the latter terminals may be similarly equipped with hemispherical depressions, so as to give a better bearing surface as previously described for pressure point 3; lever 4 may have a different shape, as for example, it may be reversed so as to be flat on top and have its fulcrum at the bottom of a V-shape; or lever 4 may be in the form of a plate rather than a spider. In the latter event the load would still be applied at the three points as indicated, and such a plate is still to be included in the term "3-armed loading lever" as used in the claims. Obviously the press may be of larger size or smaller size to accommodate any work or supply any desired pressure. The size indicated however is particularly suitable for the home workshop; and for laminating work as indicated above a press of about the size described in the specific example is preferred.

Other modifications which would be apparent to one skilled in the art may be made without departing from the scope in the invention as defined in the following claims.

I claim:

1. A press which comprises a fixed platen and a movable platen, and means for applying pressure at a single central point on the movable platen and thereby forcing it toward the fixed platen, said means comprising a 3-armed loading lever the fulcrum of which bears on said central point and the arms of which extend to three terminals approximately equidistantly disposed around the outside edges of the platens.

2. A press which comprises a rectangular bed between a fixed platen and a movable platen, and means for applying pressure at a single central point on the movable platen and thereby forcing it toward the fixed platen, said means comprising a 3-armed loading lever the fulcrum of which bears on said central point, two arms of said loading lever being reaction arms which terminate beyond opposite sides of said bed at an equal distance forward from said fulcrum, and the third arm of said loading lever being a loading arm which extends straight backward from said fulcrum for a distance larger than said equal distance forward.

3. A press which comprises a horizontal bed between a fixed platen and a movable platen, means for applying pressure at a single central point on the movable platen, said means comprising a 3-armed loading lever the fulcrum of which bears on said central point, two arms of said loading lever being reaction arms which extend beyond opposite sides of said bed and terminate at an equal distance forward from said fulcrum, and the third arm of said loading lever being a loading arm which extends straight backward from said fulcrum for a distance larger than said equal distance forward, means for varying the distance between the outer terminals of said reaction arms and said fixed platen, and means for applying pressure through a spring to the outer terminal of said loading arm so as to move it toward said fixed platen.

4. A press which comprises a rectangular bed between a fixed platen and a movable platen, means for applying pressure to the entire bed through a single central point on the movable platen, said means comprising a 3-armed loading lever the fulcrum of which bears on said central point, two arms of said loading lever being reaction arms which extend beyond opposite sides of said bed and terminate at an equal distance forward from said fulcrum, and the third arm of said loading lever being a loading arm which extends straight backward from said fulcrum for a distance larger than said equal distance forward, lifting springs at each terminal of said lever to support said lever and said movable platen, means for varying the distance between the outer terminals of said reaction arms and said fixed platen, and means applying pressure through a loading spring to the outer terminal of said loading arm so as to move the movable platen toward said fixed platen.

5. A press which comprises a base having a central rectangular bed, a movable platen having a lower surface coinciding with said rectangular bed and an upper surface having an approximately hemispherical central point, a 3-armed loading lever the fulcrum of which bears on said central point, two arms of said loading lever being reaction arms which extend to terminals beyond opposite sides of said bed at an equal distance forward from said fulcrum, and the third arm of said loading lever being a loading arm which extends straight backward from said fulcrum for a distance larger than said equal distance forward, means for adjusting the maximum distance between the outer terminals of said reaction arms and said base, and means for applying a known pressure at the outer terminal of said loading arm so as to move it toward said base, said latter means comprising a loading spring through which said pressure is applied, and a scale adjacent to said loading spring adapted to measure the amount of compression thereof and thereby indicate the degree of pressure being applied.

6. A portable press suitable for preparing laminated protectors which comprises a base the upper surface of which is adapted as a fixed rectangular platen; a pressure pad the lower surface of which is adapted as a movable rectangular platen, the upper surface of which comprises a raised central point of hemispherical shape, and the thickness of which decreases between said central point and the sides and ends thereof; a 3-armed loading lever the fulcrum of which is recessed to receive and bear upon said raised central point of said pressure pad, the two reaction arms of said lever extending symmetrically to terminals just beyond the sides of said platens and an equal distance forward from said fulcrum, and a loading arm extending straight backward from said fulcrum for a distance larger than said equal distance forward; leveling knobs located between said two reaction arms and the upper surface of said pressure pad; adjustable bolts extending from the extremities of all three lever arms and fastened to said base; lifting springs surrounding said bolts between said lever arms and said base; and a loading spring surrounding the bolt above said loading arm and below the head thereof.

7. A press according to claim 6 in which the pressure pad is removable and a removable flat plate is inserted between the two platens to facilitate introduction of the work into the press.

8. A press according to claim 1 in which the central point of the movable platen is attached to the fulcrum of the loading lever by means of a universal joint.

9. A press according to claim 1 in which the distance between each terminal of the loading lever and the fixed platen is adjustable.

10. A press according to claim 1 in which adjustable bolts connect each terminal of said loading lever to said fixed platen.

11. A press according to claim 1 in which adjustable bolts extend between each terminal of said loading lever and said fixed platen, and a loading spring is employed between the head of one of said bolts and the top of the corresponding terminal of the loading lever.

PAUL Z. ANDERSON.

REFERENCES CITED

The following references are of record in the file of this patent:

UNITED STATES PATENTS

| Number | Name | Date |
|---|---|---|
| 2,337,629 | Shortell | Dec. 28, 1943 |

FOREIGN PATENTS

| Number | Country | Date |
|---|---|---|
| 2,752 | Great Britain | 1880 |